United States Patent [19]

Shirahata et al.

[11] Patent Number: 5,133,537
[45] Date of Patent: Jul. 28, 1992

[54] MOLDING FOR WINDSHIELD OF AUTOMOBILE AND ITS MOLDING APPARATUS

[75] Inventors: Itaru Shirahata, Handa; Yoichi Hirai, Oobu, both of Japan

[73] Assignee: Tokai Kogyo Kabushiki Kaisha, Aichi, Japan

[21] Appl. No.: 600,808

[22] Filed: Oct. 22, 1990

[30] Foreign Application Priority Data

Oct. 27, 1989 [JP] Japan .................. 1-281295

[51] Int. Cl.$^5$ .............................. E04B 1/62
[52] U.S. Cl. ..................... 296/93; 296/154
[58] Field of Search ................ 296/93, 154, 213

[56] References Cited

U.S. PATENT DOCUMENTS 4,757,659  7/1988  Miyakawa et al.
4,765,936  8/1988  Ballocca.
4,865,796  9/1989  Tamura et al.

Primary Examiner—Johnny D. Cherry
Assistant Examiner—Joseph D. Pape
Attorney, Agent, or Firm—Wenderoth, Lind & Ponack

[57] ABSTRACT

A molding is disclosed and is adapted to be fit into a gap defined about a periphery of an automobile windshield between the windshield and a window frame of the automobile. The molding includes a main body portion including an elongated upper molding section adapted to extend along an outer periphery of the windshield, and a pair of elongated side molding sections adapted to extend along opposing side peripheries of the windshield. Each of the upper and side molding sections includes an inner portion adapted to extend into the gap between the windshield periphery and the window frame, and an outer portion adapted to overlie an outer surface of the windshield. The outer portion has a rain water guide groove formed therein longitudinally along a side of each of the side molding sections. The guide groove is gradually reduced in thickness along the elongated main body portion from predetermined locations on the side molding sections to predetermined locations on the upper molding sections, such that the guide groove is gradually reduced in width and is absent along substantially an entire length of the upper molding section. In addition, the molding includes a decoration member bonded to an outer surface of the main body portion. The elongated main body portion is a continuous unitarily molded element.

2 Claims, 7 Drawing Sheets

MOLDING FOR WINDSHIELD OF AUTOMOBILE AND ITS MOLDING APPARATUS

FIELD OF THE INVENTION

This invention relates to a molding for a windshield of an automobile for sealing the gap occurring between the peripheral portion of the windshield of an automobile and a window frame of a body and for decorating that portion, and to its molding apparatus.

DESCRIPTION OF THE PRIOR ART

Recently, among moldings for windshield of this kind (hereinafter called merely the "moldings") which are fitted to both side portions of the windshield 31 side molding 32a are provided with rain water guide grooves 33 as shown in FIG. 13 of the accompanying drawings. These grooves 33 are disposed in order to prevent sideway scattering and subsequent invasion of rain water, water adhering to the windshield 31 during driving, water getting into a driver's seat, and the obstruction of the field of view from the driver's seat due to rain water adhering to door glasses on the sides of the vehicle.

However, a side molding 32a equipped with a rain water guide groove 33 cannot be used for the upper portion of the windshield 31. Therefore, an upper molding 32b not equipped with a rain water guide groove 33 is molded separately and is connected and fitted to the side moldings 32a by use of corner joints 34. In other words, the conventional molding consists of five components, that is, two side moldings 32a, one upper molding 32b and two corner joints 34.

Accordingly, the number of components is large and assembly time becomes great, so that the cost of production becomes high. Furthermore, it is difficult to bring luster, color tone, and the like, of the corner joints 34 into strict conformity with those of side and upper moldings 32a, 32b, so that the functions 35 between them become recognizable and give an awkward appearance. Still another problem is that a gap occurs at a the function 35 between the corner joint 34 and each molding 32a, 32b, and damage is likely to start at this gap.

SUMMARY OF THE INVENTION

The molding in accordance with the present invention comprises a main body portion which is fitted to the peripheral portion of a windshield and a decoration member portion which is bonded integrally onto the upper surface of this main body portion. The thickness of a thick (or outer) portion disposed integrally on the upper (or outer) surface of the main body portion becomes progressively greater from corner portions to side portions. The thick portions are disposed at only the side molding portions so as to integrate the side molding portions with the upper molding portion, and a rain water guide portion is formed on the inner peripheral side of the thick portion.

In accordance with the present invention, the corner joints of the conventional molding become unnecessary because the side molding portions and the upper molding portion are molded integrally, such that the strength of the corner portions of the molding can be improved. Since no functions exist at the corner portions, overall appearance can be improved. Since the number of components becomes only one, assembly time can be reduced, and therefore the cost of production can be reduced.

The molding apparatus for a molding in accordance with the present invention comprises a molding die apparatus which includes a first extrusion port corresponding to the sectional shape of a main body portion of each side molding portion fitted to each side portion of the windshield, a second extrusion port corresponding to the sectional shape of a decoration member portion of the side molding portion, the first and second extrusion ports being disposed separately from each other in a basic molding die, and a movable molding die fitted linearly movably to the front surface of the basic molding die, for changing the thickness of a thick portion to be formed integrally on the upper surface of the main body portion; and a bonding roller apparatus which includes a pair of bonding rollers for superposing and bonding the main body portion and the decoration member portion to each other immediately after they are extruded separately from the molding apparatus, at least one of the bonding rollers being capable of moving. Accordingly, the thick portion is formed integrally on the upper surface of the main body portion by extruding and bonding the main body portion. Thus, the decoration member portion of the molding and the side molding portion having the rain guide groove formed on its thick portion and the upper molding portion not equipped with the thick portion on its main body portion can be molded continuously.

BRIEF DESCRIPTION OF THE DRAWINGS

FIGS. 1 to 12 are drawings useful for explaining the present invention, wherein:

FIG. 1 is a perspective view of an automobile to which a molding in accordance with the present invention is fitted;

FIG. 2 is a partial cut-away sectional perspective view of the molding fitted to the peripheral portion of a windshield;

FIGS. 3 and 4 are enlarged sectional views taken along lines $X_1$—$X_1$ and $X_2$—$X_2$ of FIG. 2, respectively;

FIG. 5 is a front view of a molding apparatus for forming the molding arranged for molding the of side molding portions;

FIG. 6 is a sectional view taken along line Y-Y of FIG. 5;

FIG. 7 is a side view of the molding apparatus as seen when the molding is being molded;

FIG. 8 is a partially cut-away sectional perspective view of another molding fitted to the peripheral portion of front glass;

FIGS. 9 and 10 are sectional views taken along lines $Z_1$—$Z_1$ and $Z_2$—$Z_2$, respectively;

FIG. 11 is a perspective view of a core material that is punch-molded; and

FIG. 12 is a side view of the molding apparatus during the molding of the molding shown in FIG. 8;

DESCRIPTION OF THE PREFERRED EMBODIMENT

Hereinafter, a molding ($M_1$) and its molding apparatus in accordance with the present invention will be explained with reference to FIGS. 1 to 7.

Figure 1:
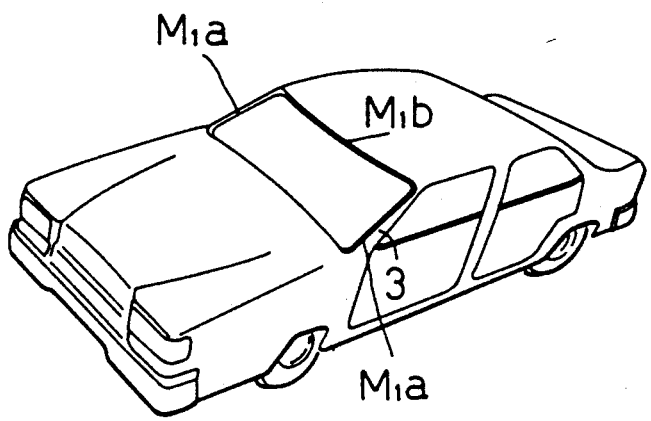
Figure 2:
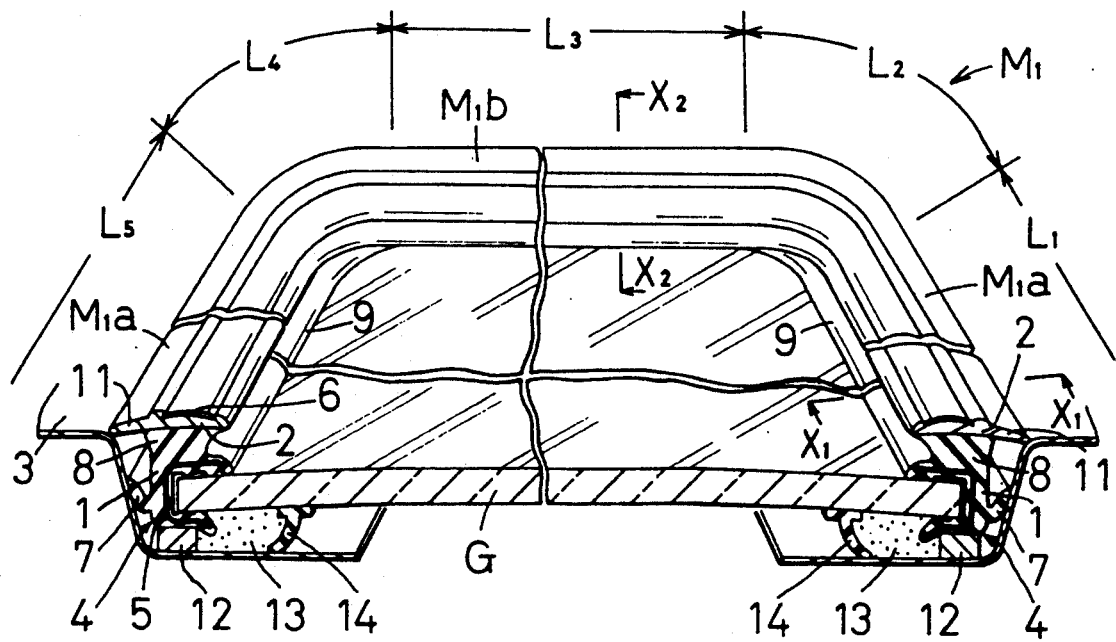

As shown in FIG. 2, the molding ($M_1$) comprises an integrally molded article having side molding portions ($M_{1a}$) and upper molding portion ($M_{1b}$) which are to be fitted to the side portions and upper portion of a windshield (G), respectively, and are molded integrally by a later-described molding apparatus.

Figure 3:
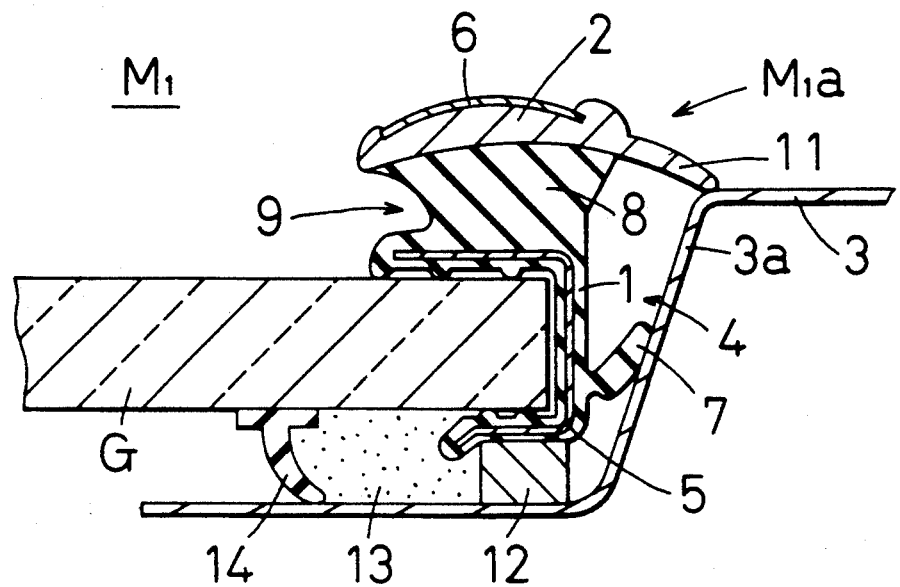
Figure 4:
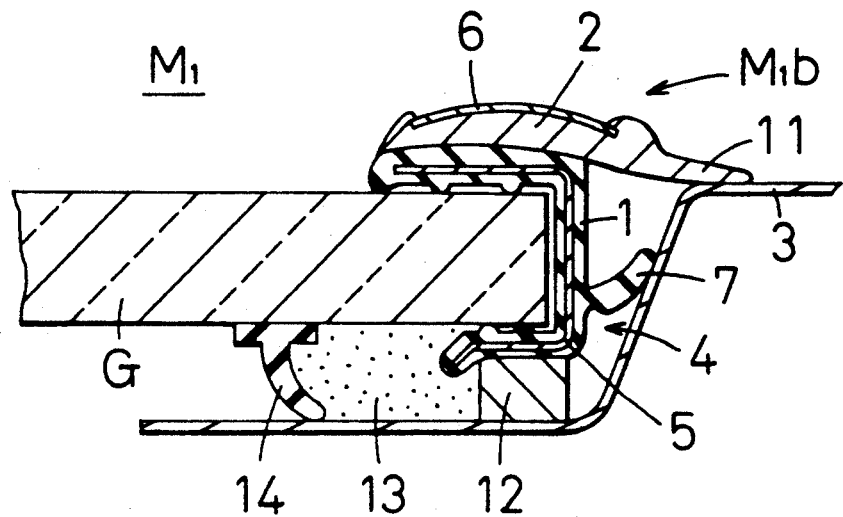

As shown in FIGS. 2 to 4, each of the side molding portions ($M_{1a}$) and the upper molding portion ($M_{1b}$) consists of a main body portion 1 and a decoration member portion 2 bonded integrally onto the upper surface of the main body portion 1. The main body portion 1 of each molding portion ($M_{1a}$), ($M_{1b}$) has a U-shaped section and is fitted to the peripheral portion of the windshield (G). Its decoration member portion 2 covers the gap 4 that occurs between the peripheral portion of windshield (G) and a body panel 3 of a window frame. Each of the main body portion 1 and the decoration member portion 2 is molded from a flexible material such as a rubber, a soft PVC, or the like. A reinforcing core material 5 is buried into the main body portion 1 during molding and a decoration thin sheet 6 is molded integrally on the surface of the decoration member portion 2.

As shown in FIGS. 2 and 3, a panel lip 7 is formed in such a manner as to protrude from outside a lower end (or inner portion) of the main body portion 1 of the side molding portion ($M_{1a}$) and a thick (or outer) portion 8 is formed integrally at the upper (or outer) part of the main body portion 1. A rain water guide groove 9 is defined on the inner peripheral side of this thick portion 8. The decoration member portion 2 is bonded integrally onto the upper (or outer) surface of the thick portion 8 disposed on the main body portion 1 and a decoration lip 11 protrudes from the outer peripheral side of this decoration member portion 2. The panel lip 7 comes into resilient contact with a sloped portion 3a of the body panel 3 and the decoration lip 11 comes into resilient contact with the upper surface of the body panel 3 when the main body portion 1 of the molding ($M_1$) is fitted into the peripheral portion of windshield (G) and the molding ($M_1$) is fitted between the peripheral portion of windshield (G) and the window frame of the body.

As shown in FIGS. 2 and 4, the upper molding portion ($M_{1b}$) is not provided with the thick portion 8 on its main body portion 1 and only this portion is different from the side molding ($M_{1a}$). Accordingly, the rain water guide groove 9 is not formed in the upper molding portion ($M_{1b}$).

As shown in FIG. 2, the thickness of the thick portion 8 disposed integrally on the upper surface of the main body portion 1 of the molding ($M_1$) becomes progressively greater from the corner portions to the side portions but at the side molding portions ($M_{1a}$), the thickness of the thick portion 8 is constant throughout the full length. Therefore, the side molding portions ($M_{1a}$) and the upper molding portion ($M_{1b}$) are integral with one another and each rain water guide groove 9 formed on the inner peripheral side of the thick portion 8 of the side molding portions ($M_{1a}$) disappears at the connecting portion with the upper molding portion ($M_{1b}$).

When windshield (G) is fitted into the window frame of the body with this molding ($M_1$) fitted into the peripheral portion of windshield (G), its position relative to the body panel 3 is determined by a support member 12 which is fitted to the lower surface of the main body portion 1 of the body panel 3 and windshield (G). In this manner, the molding ($M_1$) is fitted into the gap 4 defined between the peripheral portions of windshield (G) and the window frame of the body such that the gap 4 is closed. Incidentally, reference numeral 14 in FIGS. 2 to 4 represents a rubber dam for preventing outflow of a sealant 13.

Figure 5:
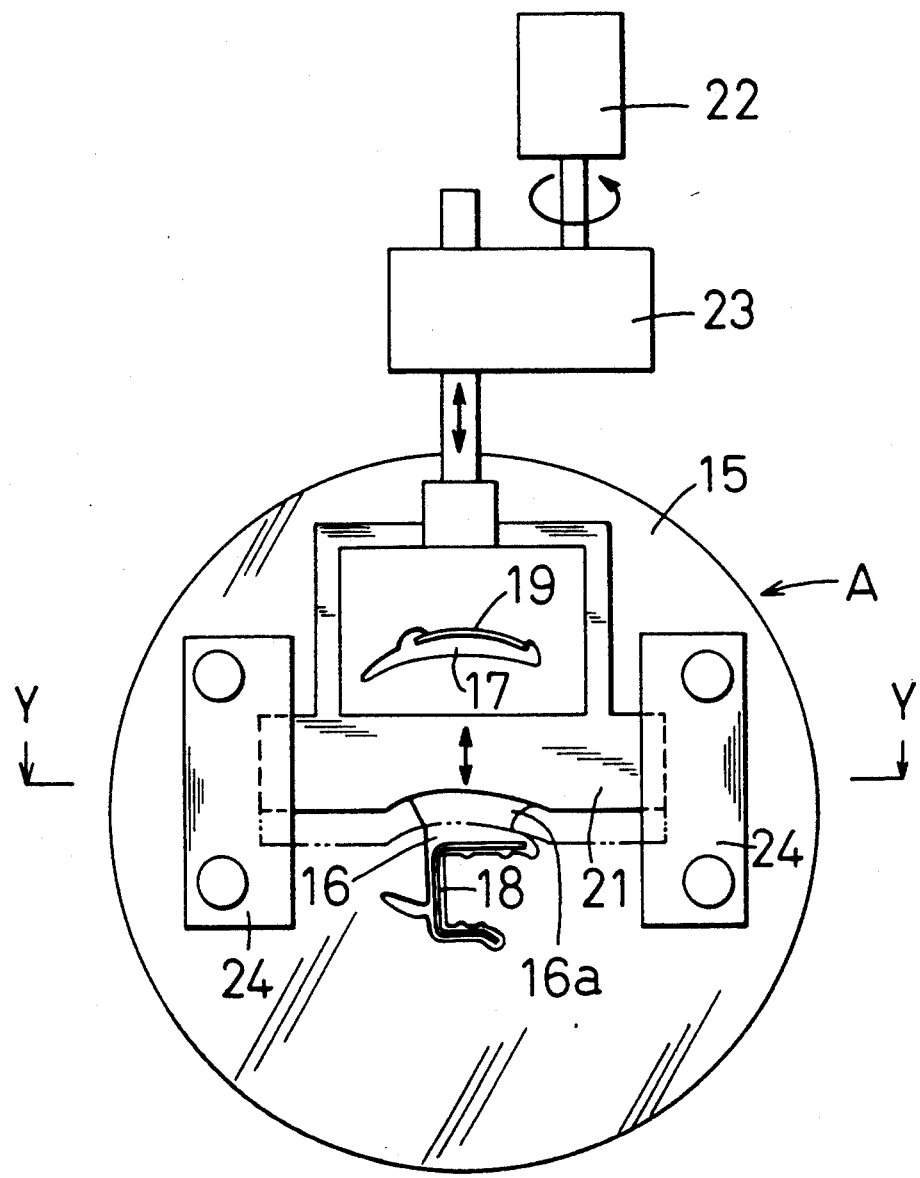
Figure 6:
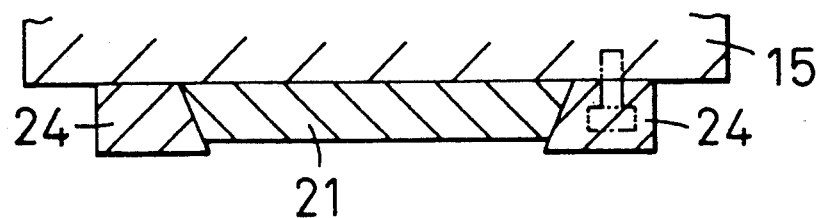

Next, the molding apparatus for forming the molding ($M_1$) in accordance with the present invention will be explained with reference to FIGS. 5 to 7.

A first extrusion port 16 and a second extrusion port 17, that correspond to the sectional shape of the main body portion 1 of the side molding portion ($M_{1a}$) and to the sectional shape of the decoration member portion 2, respectively, are disposed such that they are separately along a vertical direction in a basic molding die 15 of the molding die apparatus (A). Extrusion ports 18, 19 for the core material 5 and the decoration thin sheet 6 are included with each of the extrusion ports 16, 17.

A movable molding die 21 is mounted for forward and backward movement on the front surface of the basic molding die 15 in such a manner as to partially cover the first extrusion port 16. The movable molding die 21 is also movable back and forth in the direction of thickness of the first extrusion port 16 (i.e. transversely along the plane of the drawing sheet of FIG. 5). The movable molding die of the portion 16a of the first extrusion port 16 where the thick portion 8 is to be formed. The rotation of a driving motor 22 is converted to linear motion by a conversion mechanism 23 so that the movable die 21 moves back and forth while being guided by a guide member 24. In FIG. 5, solid line and two-dot-chain line represent the molding position of the molding die 21 when used to mold the side molding portion ($M_{1a}$) and the upper molding portion ($M_{1b}$), respectively A bonding roller apparatus (B) is disposed to be connected to the molding die apparatus (A) as shown in FIG. 7. This bonding roller apparatus (B) comprises a pair of bonding rollers 25a, 25b mounted vertically relative to one another and the upper bonding roller 25a is movable in the vertical direction. The main body portion 1 and decoration member portion 2 of the molding ($M_1$) are extruded continuously from the first and second extrusion ports 16, 17 of the basic molding die 15, and the decoration member portion 2 is mounted on the main body portion 1 immediately after extrusion. When they are mounted to one another in this manner and then pass between the pair of bonding rollers 25a, 25b, the main body portion 1 and the decoration member portion 2 are bonded integrally.

When the movable molding die 21 is suitably moved during molding, the thickness of the portion 16a of the first extrusion port 16, at which the thick portion 8 is to be formed, changes, so that the side molding portion ($M_{1a}$) and the upper molding portion ($M_{1b}$) are molded continuously.

Figure 7:
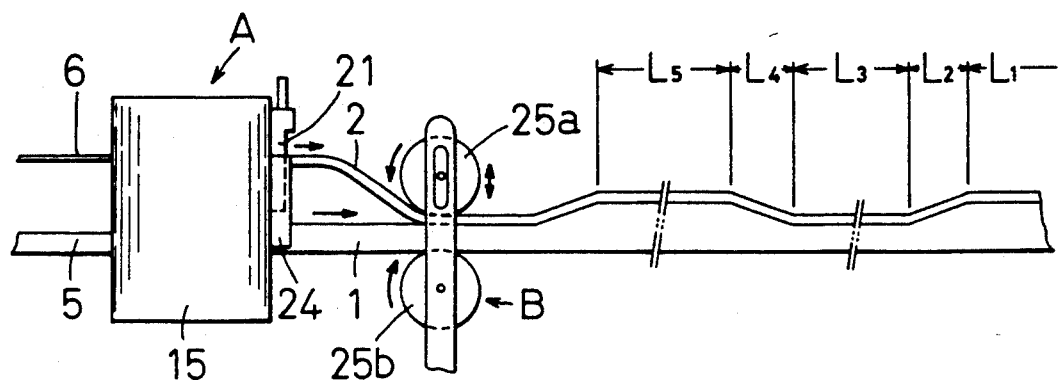

In FIG. 7, symbols ($L_1$) through ($L_5$) represent the different portions of the molding ($M_1$) that are molded continuously and that correspond to the portions in FIG. 2 represented by the same reference numerals. The movable die 21 is at a standstill at the rise end in the zones ($L_1$) and ($L_5$), lowers at a slowly in the zone ($L_2$), is at halt at the descent end in the zone $L_3$) and rises at a low speed in the zone ($L_4$).

The desired molding ($M_1$) can be obtained by cutting the elongated molding, which is molded continuously by the molding apparatus consisting of the molding die apparatus (A) and the bonding roller apparatus (B), at predetermined location and conducting bending operations at the portions between the side molding portions ($M_{1a}$) and the upper molding portion ($M_{1b}$).

FIGS. 8 to 12 show another molding (M₂) in accordance with the present invention. In the description of this molding (M₂), like parts will be given reference numerals with respect to the molding (M₁) described above.

Figure 11:
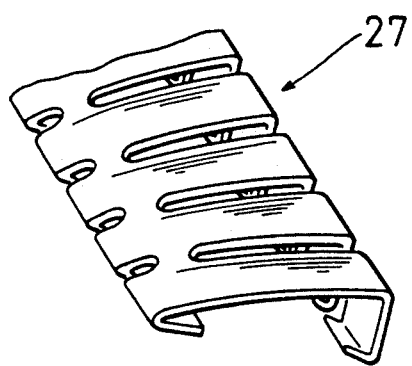

The structure of this molding (M₂) such that it is fitted to the peripheral edge portion of the windshield (G) by use of clips 26. The thickness of the thick o portion 8' disposed integrally on the upper surface of the main body portion 1' of the side molding portion (M₂ₐ) changes so as to become progressively smaller towards the upper molding (M₂ᵦ) throughout its full length. Accordingly, the groove width of the rain water guide groove 9' formed on the inner peripheral side of the thick portion 8' becomes progressively smaller towards the upper molding portion (M₂ᵦ) and disappears at the upper molding portion (M₂ᵦ). Since the core material 27, which is punch-molded and is shown in FIG. 11, is buried into the main body portion 1', the corner portions can be molded easily by bending operations at the connecting portions between the side molding portions (M₂ₐ) and the upper molding portion (M₂ᵦ) without any specific bending work. For this reason, fitting of the molding (M₂) to the windshield (G) becomes easier.

Since the punch-molded core material 27 is buried into the main body portion 1', so-called "sink" occurs on its surface but the portion where this "sink" occurs is bonded and covered with the decoration member 2', such that the "sink" does not detract from the appearance.

Figure 8:
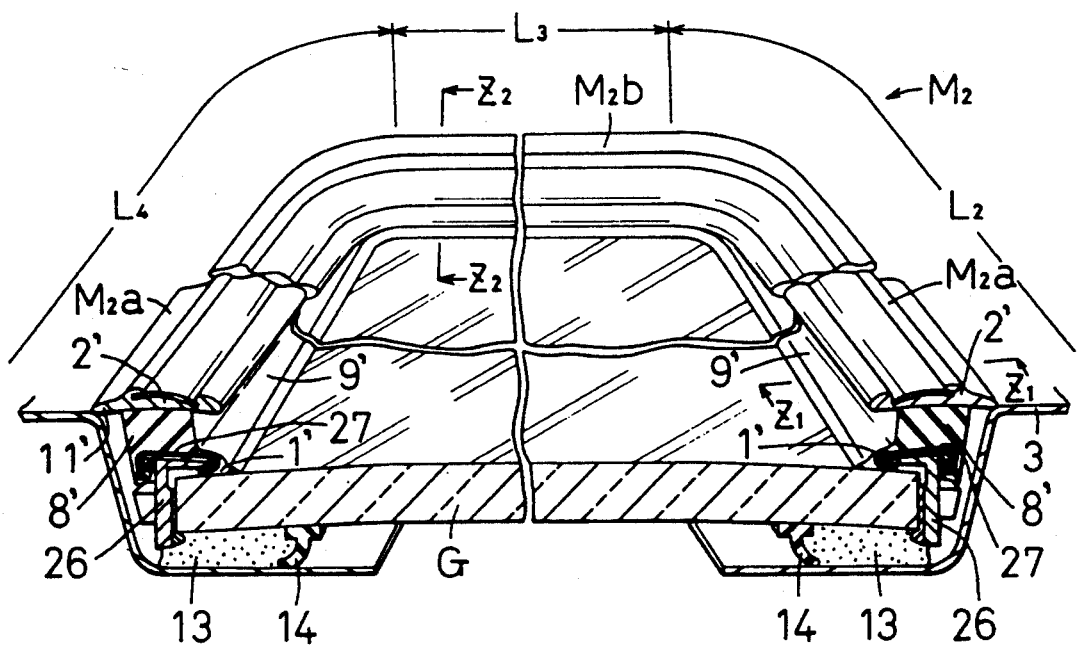
Figure 9:
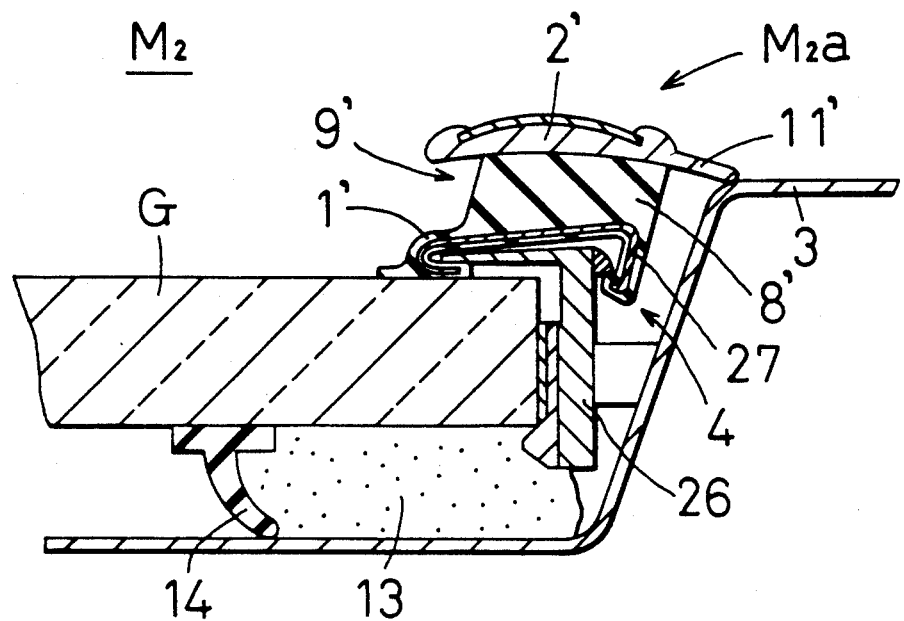
Figure 10:
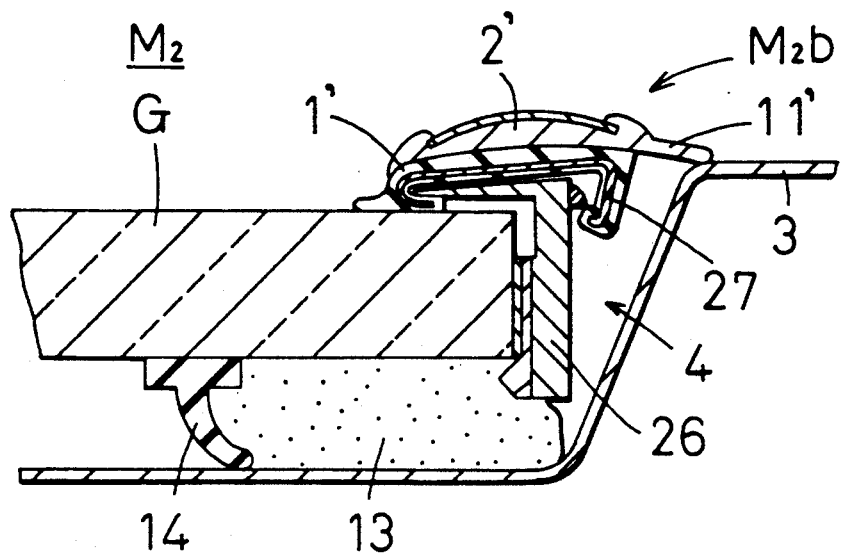
Figure 12:
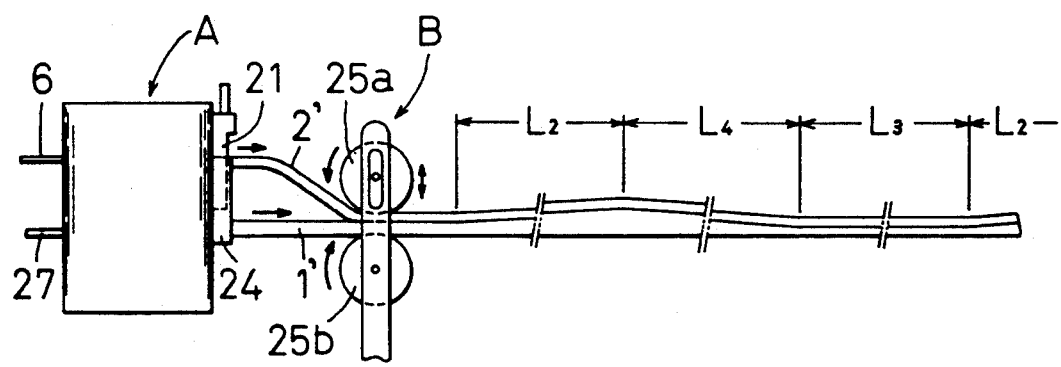
Figure 13:
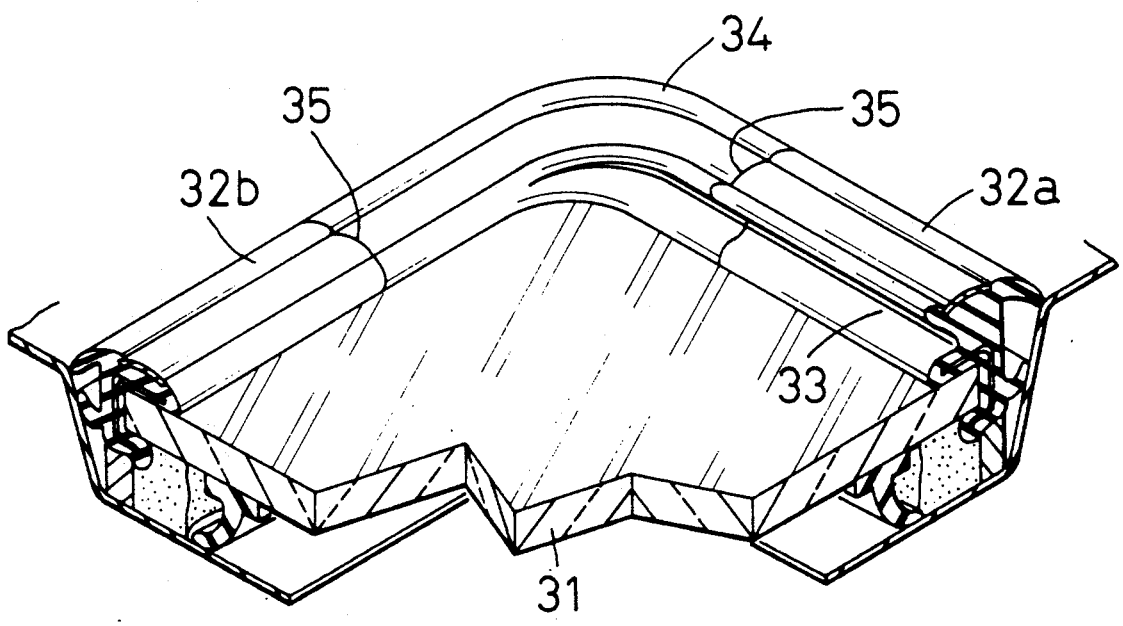
FIG. 13 is a sectional perspective view of the corner portions of a conventional molding.

This molding (M₂) can be molded by the molding apparatus described above. In other words, the thickness of the molded thick portion 8' can be changed progressively by moving the movable molding die 21 at a low speed in a predetermined direction during molding of the side molding portion (M₂ₐ). In FIG. 12, symbols (L₂) through (L₄) represent the different portions of the molding (M₂) which is molded continuously and the portions corresponding to those in FIG. 8 are represented by the same reference numerals.

What is claimed is:

1. A molding comprising:
an elongated main body portion including an elongated upper molding section, and a pair of elongated side molding sections, each of said upper and side molding sections including an inner portion and an outer portion, said outer portion having a rain water guide groove formed therein longitudinally along a side of each of said side molding sections and said outer portion being gradually reduced in thickness along said elongated main body portion from predetermined locations on said side molding sections to predetermined locations on said upper molding section, such that said groove is gradually reduced in width and is absent along substantially an entire length of said upper molding section;
an elongated decoration member bonded to an outer surface of said main body portion; and
wherein said thickness of said outer portion and said width of said groove are progressively reduced along substantially an entire length of each of said side molding sections.

2. A molding as recited in claim 1, wherein said elongated main body portion is a continuous unitarily molded element.

* * * * *